(12) United States Patent  (10) Patent No.: US 7,689,324 B1
Krenz et al.  (45) Date of Patent: Mar. 30, 2010

(54) AIRCRAFT CAPABILITY AND HAZARD ZONE INTERFACE AND METHOD

(75) Inventors: Michael J. Krenz, Cedar Rapids, IA (US); David J. Weiler, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 330 days.

(21) Appl. No.: 10/873,362

(22) Filed: Jun. 21, 2004

(51) Int. Cl.
G05D 1/00 (2006.01)
G06F 17/00 (2006.01)
G06G 7/78 (2006.01)
B64C 13/00 (2006.01)
G08B 21/00 (2006.01)
G01C 21/00 (2006.01)

(52) U.S. Cl. .................. 701/1; 701/14; 701/300; 244/175; 340/945; 340/963; 340/974

(58) Field of Classification Search .............. 701/1–18, 701/200, 201, 202, 208–213, 300–302; 244/75.1, 244/76, 175, 180–182, 183–188; 340/945, 340/963, 966–971, 973, 974, 947, 951–961, 340/975–980

See application file for complete search history.

(56) References Cited

U.S. PATENT DOCUMENTS

| | | | | |
|---|---|---|---|---|
| 3,774,017 A * | 11/1973 | Zagalsky | ............... | 701/14 |
| 4,212,064 A * | 7/1980 | Forsythe et al. | ............... | 701/29 |
| 4,302,745 A * | 11/1981 | Johnston et al. | ............ | 340/963 |
| 4,312,041 A * | 1/1982 | DeJonge | .................... | 701/123 |
| 4,706,199 A * | 11/1987 | Guerin | ....................... | 701/300 |
| 4,825,194 A * | 4/1989 | Rasinski | ..................... | 340/975 |
| 5,086,396 A * | 2/1992 | Waruszewski, Jr. | ......... | 701/221 |
| 5,136,512 A * | 8/1992 | Le Borne | .................... | 701/301 |
| 5,142,480 A * | 8/1992 | Morrow | ...................... | 701/219 |
| 5,258,756 A * | 11/1993 | Bauer et al. | ................. | 340/971 |
| 5,335,177 A * | 8/1994 | Boiteau et al. | ............... | 701/14 |
| 5,838,262 A * | 11/1998 | Kershner et al. | ............ | 340/945 |
| 6,181,987 B1 * | 1/2001 | Deker et al. | .................... | 701/3 |
| 6,289,277 B1 * | 9/2001 | Feyereisen et al. | .......... | 701/202 |
| 6,452,511 B1 * | 9/2002 | Kelly et al. | .................. | 340/970 |
| 6,982,655 B2 * | 1/2006 | Vialleton et al. | ............ | 340/969 |
| 7,053,796 B1 * | 5/2006 | Barber | ....................... | 340/945 |
| 2003/0016145 A1 * | 1/2003 | Bateman | ..................... | 340/967 |
| 2003/0074158 A1 * | 4/2003 | Hayashi et al. | ............. | 702/145 |
| 2004/0189492 A1 * | 9/2004 | Selk et al. | .................... | 340/973 |

* cited by examiner

*Primary Examiner*—Edward Pipala
(74) *Attorney, Agent, or Firm*—Daniel M. Barbieri

(57) ABSTRACT

A vehicle operator interface is disclosed. The vehicle operator interface comprises a visual display device. A first indicator which is representative of a vehicle energy target, a second indicator representative of a vehicle energy vector and a third indicator representative of a vehicle capability zone are on the display.

12 Claims, 2 Drawing Sheets

AIRCRAFT CAPABILITY AND HAZARD ZONE INTERFACE AND METHOD

BACKGROUND

In conventional aircraft interface systems, it is commonplace to use an energy-based guidance cue on an attitude display. The attitude display may be provided on a heads-up guidance system or on a heads-down display. The use of an energy-based cue helps the pilot guide the aircraft on a specified target flight path. Energy-based guidance systems have been successfully implemented by providing a target cue and an indication of the current energy vector of the aircraft. The objective for the pilot is to maintain the current energy vector over the target vector and to maintain such a state to achieve on-track performance of the aircraft.

Conventional energy-based guidance systems, however, are confined to the use of an energy-based target and a current energy vector cue to maintain on-track performance but do not provide any indication for an aircraft capability zone and/or for the introduction of any other types of hazard information on the display.

Accordingly, there is a need for an energy-based guidance system and method which may include aircraft capability zone information and/or other hazard information on the display. Further, there is a need for such displays provided in aircraft and in other vehicles or situations in which guidance of an object by a user is desired.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An example of the invention relates to a vehicle operator interface. The vehicle operator interface comprises a visual display device. A first indicator is on the display representative of a vehicle target energy vector. A second indicator is on the display representative of a vehicle energy vector. A third indicator is on the display representative of a vehicle capability zone.

Another example of the invention relates to a cockpit display system. The cockpit display system comprises a display. The cockpit display system also comprises a processing system coupled to the display and having a plurality of inputs. A first input to the processing system comprises a signal representative of the aircraft velocity. A second input to the processing system comprises a signal representative of the aircraft attitude. A first indicator on the display is representative of an aircraft target energy vector. A second indicator on the display is representative of an aircraft energy vector, the aircraft energy vector based on the aircraft velocity and the aircraft attitude. A third indicator is on the display representative of an aircraft capability zone.

Another example of the invention relates to a method of providing a capability zone for a vehicle. The method comprises receiving inputs from a plurality of sensors on the vehicle. The method also includes calculating a capability zone. Further, the method includes rendering a graphical depiction of the capability zone on a display.

Alternative examples and other exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
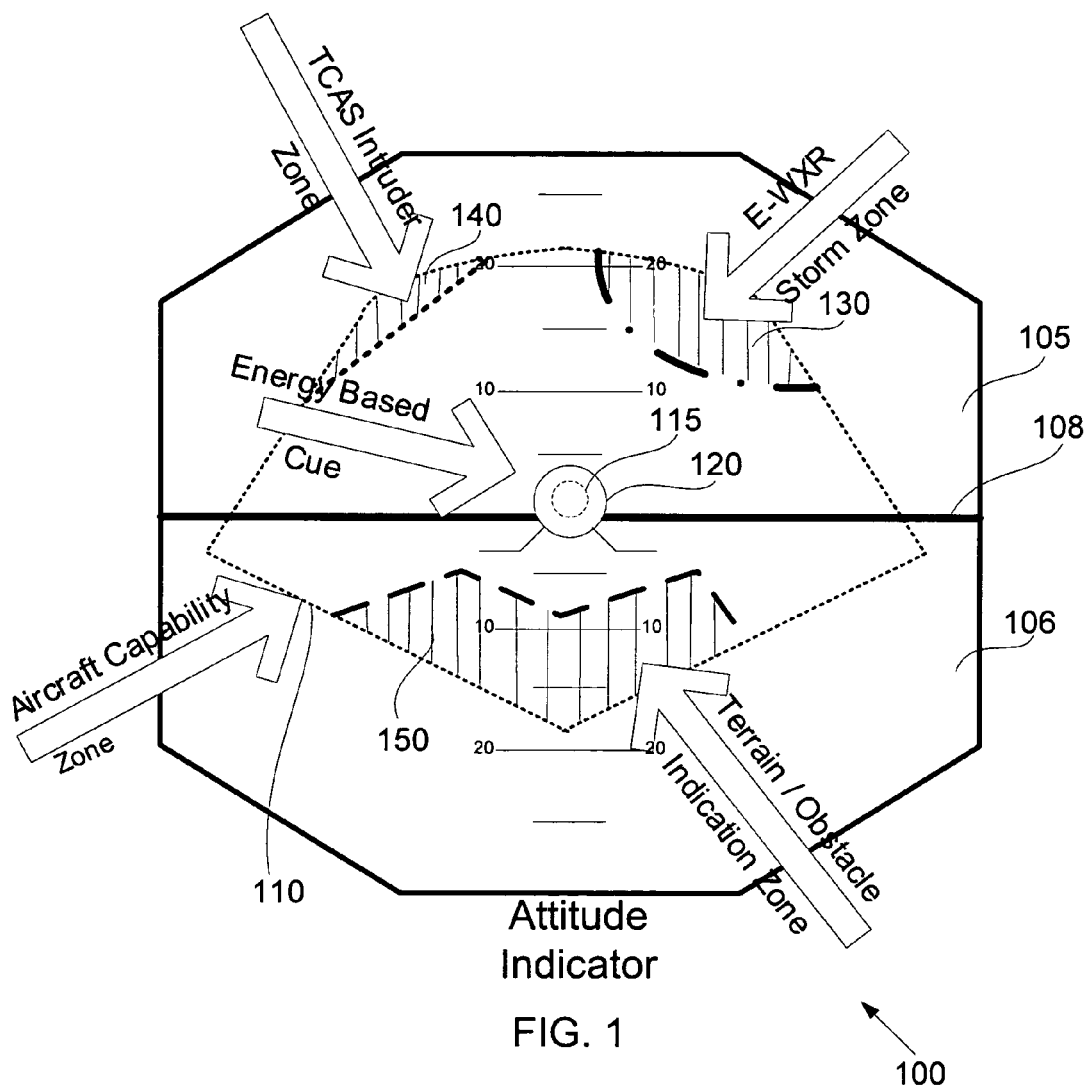
FIG. 1 is a graphical depiction of an exemplary attitude indicator showing an energy-based guidance system having hazards and in an aircraft capability zone.

With regard to FIG. 1, FIG. 1 depicts an exemplary attitude indicator 100 which may be a part of a primary flight display (PFD) or a part of any other display in an aircraft cockpit or other vehicle. The interface described is not limited to being displayed on an attitude indicator display, but may be included on any of a variety of other types of displays. On a conventional attitude indicator, air speed may also be indicated along with altitude. Also conventionally, the upper region 105 represents sky with the bottom region 106 representing earth and the line 108 representative of the horizon line. Different regions of the display and different symbols on the display may be provided with various and different colors and/or line thicknesses.

Conventionally, it is important for an aircraft pilot to fly the airplane in a zone in which hazards are not encountered and in which the aircraft is capable of flying without losing control, and/or lift. Accordingly, an aircraft should be controlled within a region of limited performance capabilities. Thus, for example, if you pull the nose of the aircraft up too high, you may not have enough thrust, and you may stall the airplane, in other words, lose lift for the aircraft. Also, in another example, if you push the nose too low, you may approach speeds at which the aircraft was not designed, and aerodynamic and acceleration induced forces on the aircraft may damage the aircraft. Similarly, dangerous flight regimes may be caused if the aircraft is banked too hard to the right or to the left. Thus, it is important for an aircraft pilot to keep the aircraft within its normal energy state. In the exemplary interface 100 depicted, line 110, exemplifies a region of normal energy state for the aircraft or an aircraft capability zone. The aircraft capability zone is representative of a region in which the energy state of the aircraft, if located therein will perform in a normal manner. The aircraft capability zone is represented by a polygon, or other closed shape.

In an exemplary embodiment, it is desirable to place an energy target 115 on the display. Energy target 115 is an indication of the desired energy state for the aircraft to follow a specified flight plan. In order to maintain the energy target 115, an energy-based cue 120 is preferably positioned over the location of energy target 115. This is done by manipulation of controls of the aircraft. The energy-based cue 120 is a pictorial representation of the current energy vector for the aircraft. The calculation of the energy vector is well known to those of ordinary skill in the art. The use of an energy target and an energy-based cue are also well known in the art and have been generally used to maintain an aircraft along a pre-programmed flight path. However, the introduction of a capability zone 110 has not previously been provided on an aircraft display in combination with an energy-based cue and an energy target.

Energy based cue 120 is conventional on a heads-up guidance system such as those produced by Flight Dynamics of Portland, Oreg. It is also desirable to place such guidance systems on heads-down displays such as those produced by Rockwell Collins of Cedar Rapids, Iowa. Further, it is desirable to place aircraft capability zone indications on the attitude indicator such that the crew may be made aware of the limitations of the aircraft, and limitations on maneuvering the aircraft due to hazards.

Such hazards may include any of a variety of different hazards for the aircraft which may include, but are not limited to, a storm zone hazard 130, an intruder zone hazard 140 and a train or obstacle zone hazard 150. Further, other types of hazards may be provided depending on the needs of the system and the type of vehicle on which the system is implemented. Storm zone 130 may be derived from enhanced weather radar or other types of weather radar. Intruder zone 140 may be provided from a traffic collision avoidance system (TCAS) or other traffic identifying system (such as ADS-B or the like). Terrain or obstacle indication zone may be derived from any of a variety of systems such as, but not limited to, terrain awareness warning systems (TAWS) and/or radar-based obstacle avoidance systems.

An aircraft pilot using the interface depicted in FIG. 1 would desire to keep the energy-based cue 120 away from the boundaries of the hazard zones 130, 140, and 150 in order to insure that the aircraft will avoid such hazards. In an exemplary embodiment, it may be desirable for various alerts and warnings to occur should an energy-based cue 120 approach or even cross into any of the hazard zones 130, 140 or 150. Similarly, it may be desirable for various warnings and alerts to be provided should energy-based cue 120 approach the boundaries of aircraft capability zone 110.

Conventionally, aircraft performance limitations have been communicated to crew members such as angle of attack indicators and stall warning systems. Interface 100 depicted in FIG. 1 utilizes the current energy vector 120 with an aircraft capability zone 110. In certain circumstances, the borders of the aircraft capability zone may be outside the normal field of view of the display, such as the attitude indicator 100 depicted in FIG. 1, and in those cases, the portions of the polygon outside of the view could either be placed at the edge of display 100 or eliminated from view altogether. The use of aircraft capability zone 110 allows the crew members or pilot to visually see how close the aircraft is to the performance limitation of the aircraft at all times.

The hazard zones are also computed in the energy space and may be presented in various ways. For instance, multiple simultaneous hazards may be represented by multiple polygons on the display. These multiple polygons may be fused where appropriate or may be overlapped. Further, indications of the severity of the hazard may also be indicated in a number of ways. For example, collision with terrain is a specific type of hazard that could be indicated with solid lines, for example, or with a bright color. A strong weather return may be indicated with dashed lines of a less intense color. Such a configuration would allow the crew to choose between hazards of differing severity. Also, using the interface depicted in FIG. 1, the crew or pilot may be able to place the energy vector within the aircraft capability zone, but clear of all hazard zones leading to greater awareness of not only the capabilities of the aircraft, but also those capabilities relative to hazards the aircraft may encounter.

Figure 2:
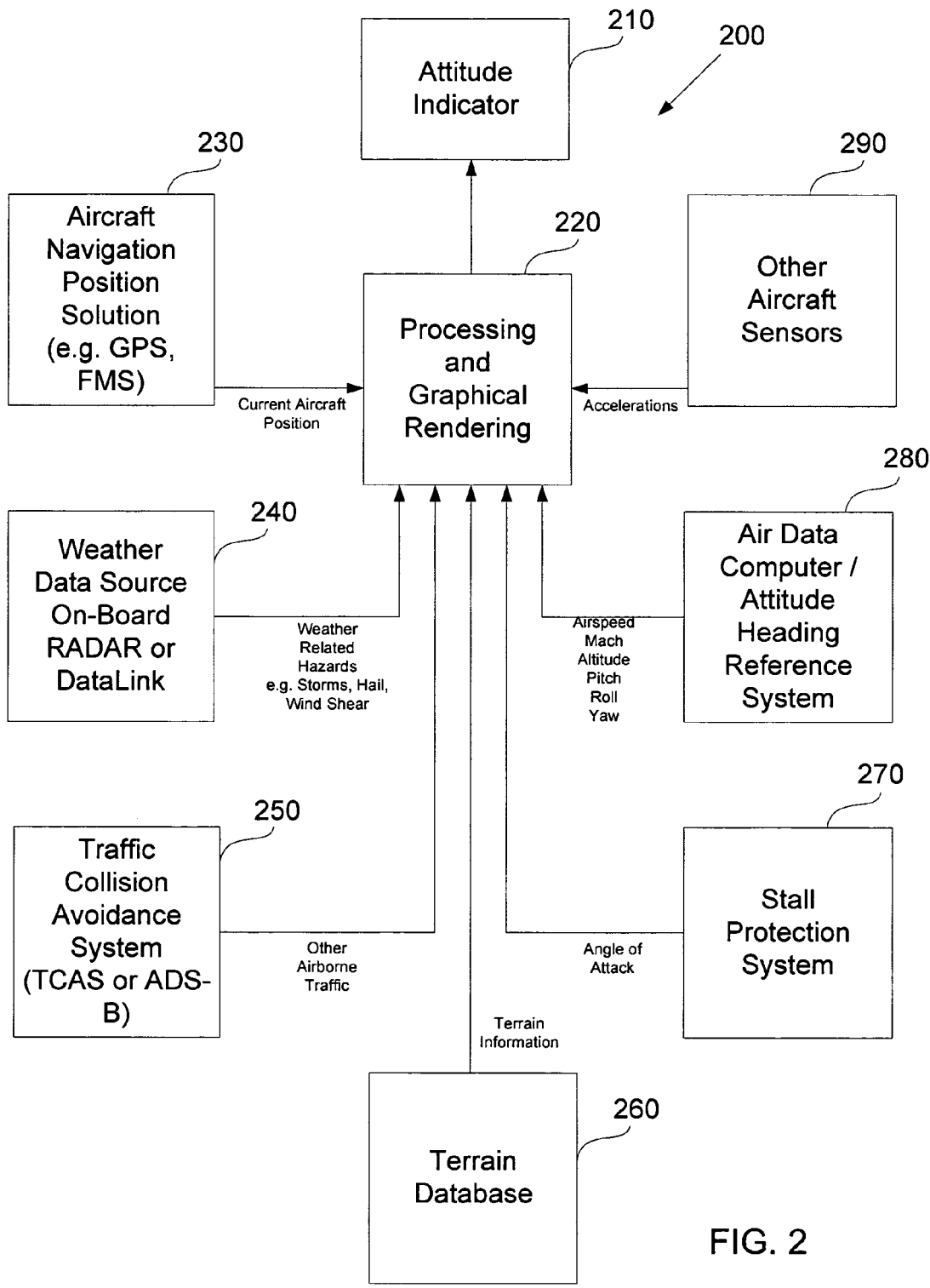
FIG. 2 is an exemplary depiction of a block diagram of the system implemented in FIG. 1 showing the inputs to a processing system.

Referring now to FIG. 2, an aircraft guidance system 200 is depicted. Aircraft guidance system 200 provides a display on attitude indicator 210. Graphic rendering and processing of input data to attitude indicator 210 is provided by a processing and graphical rendering subsystem 220. Such a subsystem may include any of a variety or number of processing devices and memory devices, etc. Processing subsystem 220 receives a plurality of inputs, some of which are provided here and some of which may be varied depending on the application. For example, processing subsystem 220 receives an aircraft navigation position solution from a subsystem 230. Subsystem 230 may be a global positioning system (GPS), a flight management system (FMS) or other navigation and positioning system. Another input to processing subsystem 220 is a weather data source such as onboard radar or data link 240. Next, a traffic collision avoidance system (TCAS) 250 may provide input to processing subsystem 220. Traffic collision avoidance systems may be any of a variety of traffic indicating systems such as TCAS or ADS-B.

Another input to processing subsystem 220 may include terrain database 260. Terrain database 260 may be a portion of a terrain awareness and warning system (TAWS), or may be other terrain databases or terrain and obstacle detection systems. A stall protection system 270 may also provide input to processing subsystem 220. Stall protection system 270 may provide angle of attack information to processing and graphical rendering system 220. An air data computer and attitude heading reference system 280 may provide information to processing subsystem 220 such as, but not limited to air speed, mach, altitude, pitch, roll, and yaw angles. Other aircraft sensors 290 may also provide a plurality of other information to processing subsystem 220 such as, but not limited to aircraft accelerations in all directions. In operation, inputs are provided to processing subsystem 220. Such information is processed and graphical images are rendered on attitude indicator 210 similar to those such images depicted in FIG. 1.

While the detailed drawing specific examples and particular formulations given describe preferred and exemplary embodiments, they serve the purposes of illustration only. The inventions disclosed are not limited to the specific forms shown. For example, the methods may be performed in any of a variety of sequence of steps. The hardware and software configurations shown and described may differ depending on the chosen performance characteristics and physical characteristics of the electronic devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of providing a capability zone for a vehicle, comprising:
   receiving inputs from a plurality of sensors on the vehicle;
   calculating a capability zone based on the inputs, wherein the calculation of the capability zone is further based on a plurality of performance characteristics of the vehicle, wherein the capability zone is representative of a region in which an energy state of the vehicle, if located therein, will perform within performance limitations of the vehicle and, if located outside, will perform outside performance limitations of the vehicle, wherein the capability zone has at least one hazard zone located therein; and
   rendering a graphical depiction of the capability zone including the at least one hazard zone on a display.

2. The method of claim 1, wherein the vehicle is an aircraft.

3. The method of claim 1, wherein the capability zone is an energy based capability zone.

4. The method of claim 1, wherein the display is an attitude indicator.

5. The method of claim 1, further comprising:
providing an energy based cue within the capability zone on the display.

6. The method of claim 1, further comprising:
providing an energy based target within the capability zone on the display.

7. The method of claim 1, wherein the hazard zone comprises at least one of a storm zone hazard an intruder zone hazard and a terrain or obstacle zone hazard.

8. The method of claim 1, wherein the hazard zone comprises a storm zone hazard.

9. The method of claim 1, wherein the hazard zone comprises an intruder zone hazard.

10. The method of claim 1, wherein the hazard zone comprises a terrain or obstacle zone hazard.

11. The method of claim 1, wherein the hazard zone comprises a storm zone hazard, an intruder zone hazard and a terrain or obstacle zone hazard.

12. The method of claim 1, further comprising:
providing an energy based cue and an energy based target within the capability zone on the display, wherein the display enables a pilot of the vehicle to avoid hazards associated with the at least one hazard zone by keeping the energy based cue away from the at least one hazard zone, wherein the display further enables the pilot to maintain the vehicle within a desired energy state to follow a specified path by positioning the energy based cue over the energy based target.

* * * * *